United States Patent
Dohi et al.

(10) Patent No.: US 8,854,729 B2
(45) Date of Patent: Oct. 7, 2014

(54) MICROSCOPE ADAPTER UNIT

(75) Inventors: Masahito Dohi, Tokyo (JP); Kenji Kawasaki, Tokyo (JP); Kazuhiko Hosono, Tokyo (JP)

(73) Assignee: Olympus Corporation, Tokyo (JP)

( * ) Notice: Subject to any disclaimer, the term of this patent is extended or adjusted under 35 U.S.C. 154(b) by 599 days.

(21) Appl. No.: 13/071,013

(22) Filed: Mar. 24, 2011

(65) Prior Publication Data

US 2011/0235171 A1    Sep. 29, 2011

(30) Foreign Application Priority Data

Mar. 29, 2010  (JP) ................................. 2010-075510
Oct. 26, 2010  (JP) ................................. 2010-239153

(51) Int. Cl.

| G02B 21/06 | (2006.01) |
| G02B 21/00 | (2006.01) |
| G02B 13/00 | (2006.01) |
| G02B 15/14 | (2006.01) |

(52) U.S. Cl.
CPC ................ *G02B 21/06* (2013.01); *G02B 21/00* (2013.01); *G02B 13/0095* (2013.01); *G02B 15/14* (2013.01)
USPC .......................... 359/380; 359/385; 359/368

(58) Field of Classification Search
CPC .. G02B 3/0056; G02B 3/0068; G02B 6/4298; G02B 13/143; G02B 13/22; G02B 15/04; G02B 15/173; G02B 21/22; G02B 21/083; G02B 21/025; G02B 21/16; G02B 21/082; G02B 27/0068; G03F 7/70091; G03F 7/70096; G03F 7/70183
USPC ......... 359/368–390, 432, 641, 676, 434–435, 359/744

See application file for complete search history.

(56) References Cited

U.S. PATENT DOCUMENTS

| 5,143,435 A | 9/1992 | Kikuchi |
| 5,777,784 A * | 7/1998 | Tanaka .......................... 359/388 |
| 5,991,090 A * | 11/1999 | Strahle .......................... 359/660 |
| 6,142,988 A * | 11/2000 | Strahle et al. ..................... 606/4 |
| 6,657,782 B2 * | 12/2003 | Yonezawa ...................... 359/388 |
| 7,488,782 B2 * | 2/2009 | Sugano et al. .............. 525/330.3 |
| 2007/0081241 A1 * | 4/2007 | Hayashi ......................... 359/443 |
| 2009/0225408 A1 * | 9/2009 | Brehm et al. .................. 359/385 |
| 2009/0296209 A1 * | 12/2009 | Kusaka et al. ................. 359/385 |

FOREIGN PATENT DOCUMENTS

| JP | 03118509 A | 5/1991 |
| JP | 05281474 A | 10/1993 |
| JP | 06250091 A | 9/1994 |
| JP | 6-289301 A | 10/1994 |
| JP | 07-174975 A | 7/1995 |
| JP | 2008122553 A | 5/2008 |
| JP | 2009116054 A | 5/2009 |

OTHER PUBLICATIONS

Japanese Office Action dated Aug. 5, 2014 issued in counterpart Japanese Application No. 2010-239153.

* cited by examiner

*Primary Examiner* — Thong Nguyen
(74) *Attorney, Agent, or Firm* — Holtz, Holtz, Goodman & Chick, PC

(57) ABSTRACT

A microscope adapter unit disposed on an optical path of illumination light between a light source unit including a light source and a sample surface includes a first lens group having at least one lens and a second lens group having at least one lens. The first lens group converts the illumination light into roughly parallel luminous fluxes, and makes the illumination light enter the second lens group.

6 Claims, 17 Drawing Sheets

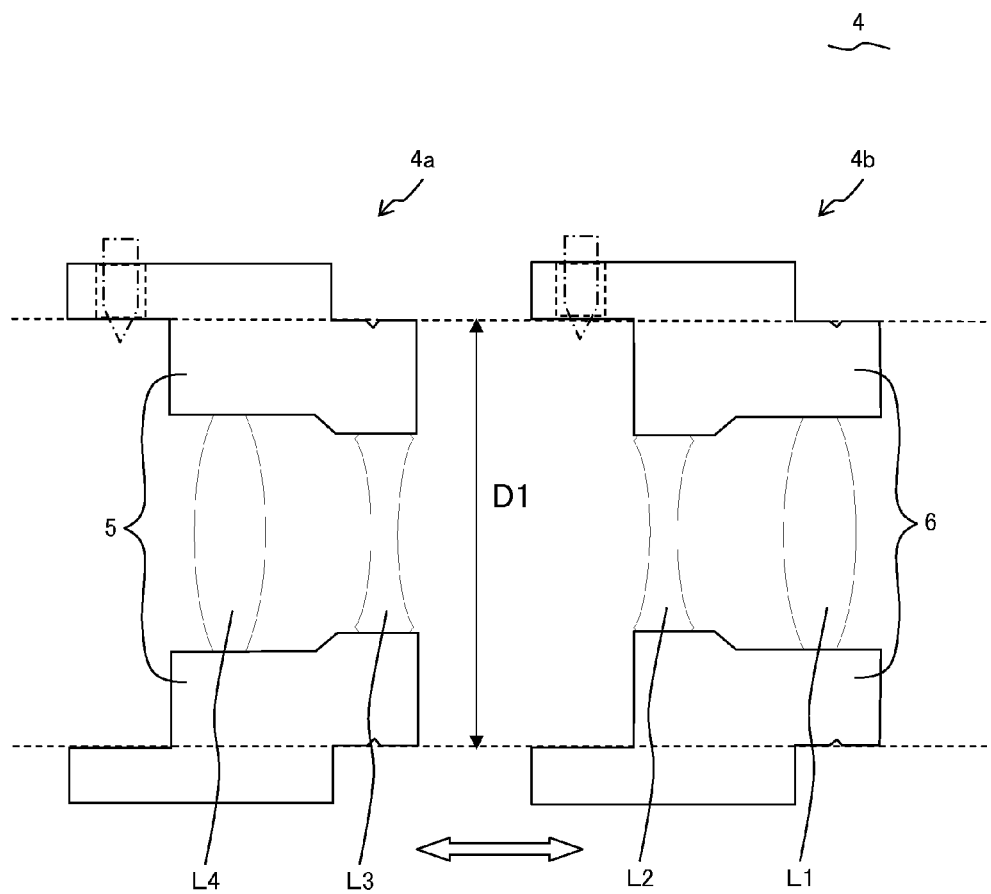
F I G. 3

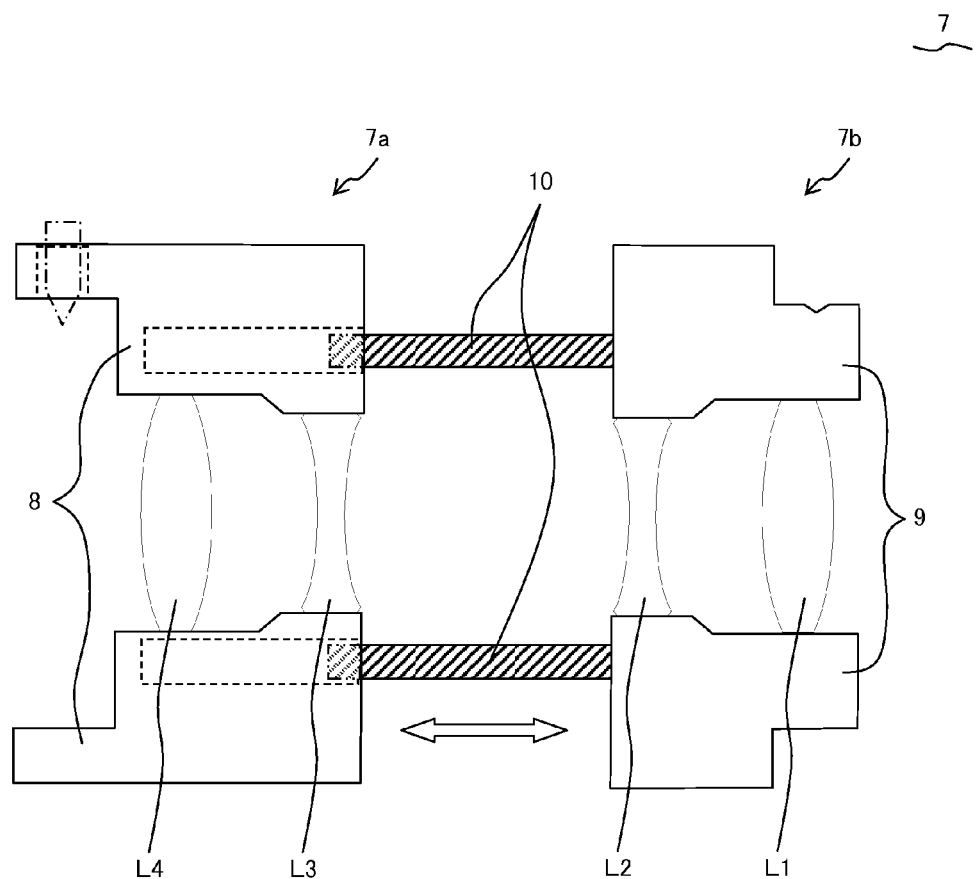
F I G. 5

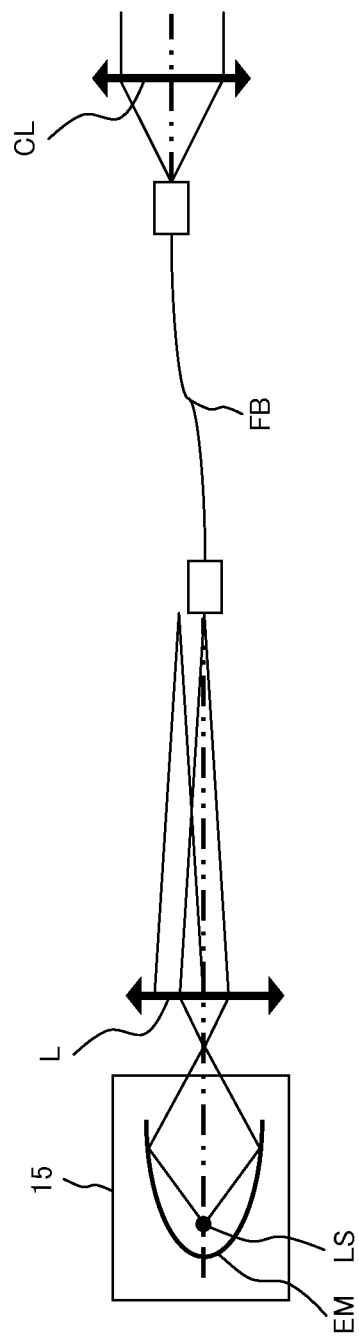
F I G. 1 0 B

MICROSCOPE ADAPTER UNIT

CROSS REFERENCE TO RELATED APPLICATIONS

This application is based upon and claims the benefit of priority from prior Japanese Patent Application Nos. 2010-075510, filed Mar. 29, 2010, and 2010-239153, filed Oct. 26, 2010, the entire contents of which are incorporated herein by this reference.

BACKGROUND OF THE INVENTION

1. Field of the Invention

The present invention relates to a microscope adapter unit that is disposed on an optical path of illumination light.

2. Description of the Related Art

In recent years, accompanying the expansion of the scope of applications of microscopes, there has been a demand that microscopes be able to respond to various observation methods. Accordingly, microscopes that selectively realize various illumination conditions in accordance with various observation methods have been proposed.

As a method of selectively realizing illumination conditions in order to respond to observation methods, a method in which a light source unit is replaced with a different light source unit has been known conventionally. However, in recent years, a method in which an additional unit provided between the light source unit and the main body of a microscope (referred to as a microscope adapter unit hereinafter) is used without replacing light source units or in addition to the replacement of light source units is also known. A microscope utilizing a microscope adapter unit is disclosed by, for example, Japanese Laid-open Patent Publication No. 6-289301 and Japanese Laid-open Patent Publication No. 7-174975.

As a microscope adapter unit, Japanese Laid-open Patent Publication No. 6-289301 discloses a variable magnification lens unit that varies the magnification for projecting light from a light source to the pupil of an objective.

Also, Japanese Laid-open Patent Publication No. 7-174975 discloses, as a microscope adapter unit, a frame that is detachable from the body (main body of a microscope) of a microscope including a converter lens that varies the magnification of the illumination system. A dichroic mirror that switches a light source unit to another light source unit used to illuminate samples is also disclosed as a microscope adapter unit.

Demand has increased steadily over the years for optimal illumination that responds to various observation methods, and higher levels of illumination performance have also been demanded. Thus, the number of optical devices or optical units containing optical devices required to meet this demand has also increased. Accordingly, the size, especially the width in the optical axis direction (referred to as unit length, hereinafter), of a microscope adapter unit has inevitably become larger and longer so that the distance between the light source unit and the microscope main body has also inevitably become greater.

As shown in FIG. 1A, in a common microscope 100, illumination light emitted from a light source 101 is converted into roughly parallel luminous fluxes B1 by a collimation optical system 102 including a collector lens or the like, is emitted from a light source unit 103, and immediately after that, enters a microscope main body 104.

More specifically, illumination light emitted from a point on optical axis O in the light source 101 (simply referred to as on-axis illumination light, hereinafter) is converted by the collimation optical system 102 into roughly parallel luminous fluxes B1 that are parallel to optical axis O as shown in FIG. 1B. Illumination light emitted from a point not on optical axis O in the light source 101 (simply referred to as off-axis illumination light, hereinafter) are converted into roughly parallel luminous fluxes B2 that are oblique to optical axis O.

SUMMARY OF THE INVENTION

A microscope adapter unit according to an aspect of the present invention is a microscope adapter unit disposed on an optical path of illumination light between a light source unit having a light source and a sample surface, including a first lens group including at least one lens and a second lens group including at least one lens, wherein the first lens group converts the illumination light into roughly parallel luminous fluxes and makes the illumination light enter the second lens group.

BRIEF DESCRIPTION OF THE DRAWINGS

The present invention will be more apparent from the following detailed description when the accompanying drawings are referenced.

FIG. 3 is a schematic sectional view showing an example of the microscope adapter unit according to embodiment 1;

FIG. 5 is a schematic sectional view showing an example of a configuration of a microscope adapter unit according to embodiment 2;

FIG. 10B explains the loss of a quantity of light occurring between a light source unit and fibers, with a movable lens disposed between the light source unit and the fibers, and in which the distance between the light source unit and the fibers is greater than in FIG. 10A;

DESCRIPTION OF THE PREFERRED EMBODIMENTS

Figure 1A:
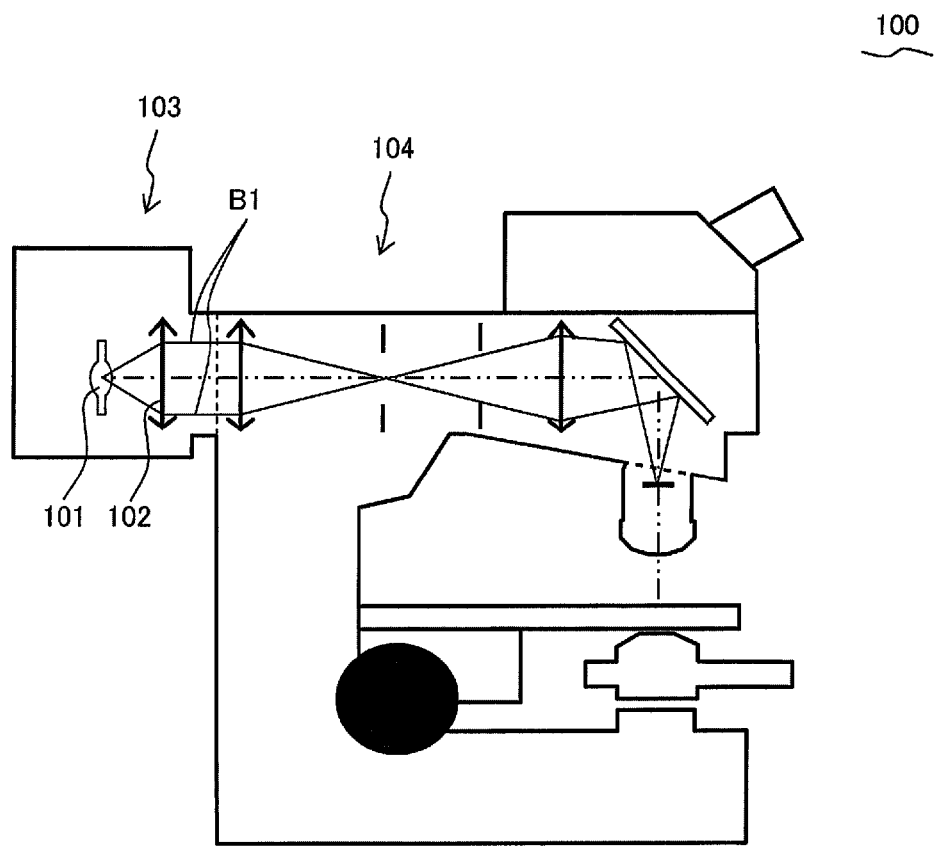
FIG. 1A shows an example of a configuration of a microscope according to a conventional technique, showing light converted into roughly parallel luminous fluxes B1.
Figure 1B:
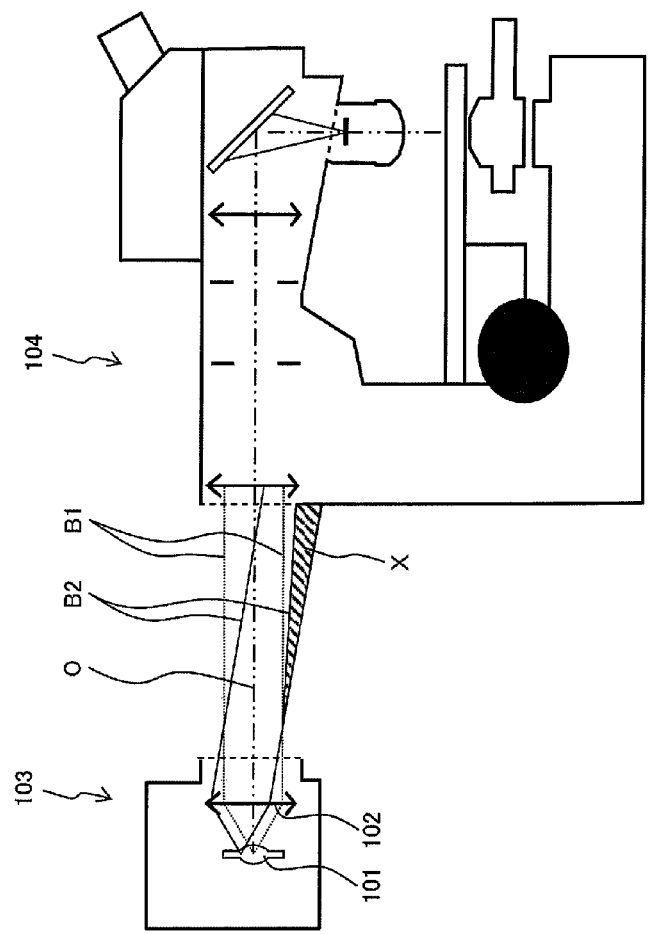
FIG. 1B shows an example of a configuration of a microscope according to a conventional technique, showing light converted into roughly parallel luminous fluxes B1 parallel to the optical axis, and roughly parallel luminous fluxes B2 that are oblique to optical axis.

Hereinafter, respective embodiments will be explained by referring to the drawings.

Embodiment 1

Figure 2:
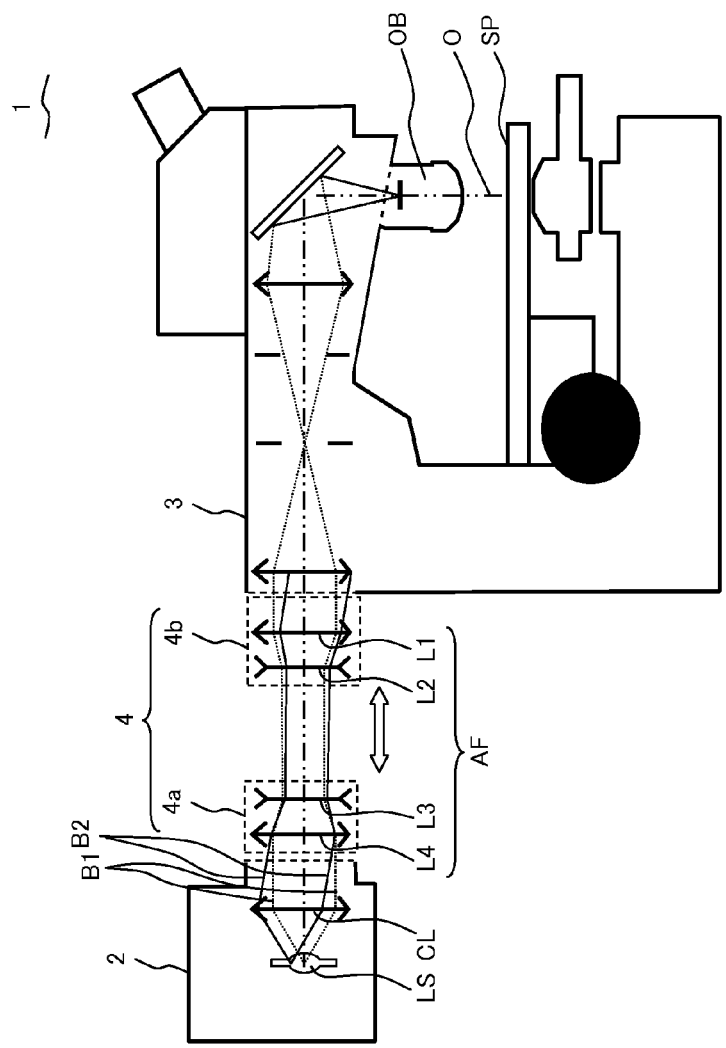
FIG. 2 is a schematic view showing an example of a configuration of a microscope including a microscope adapter unit according to embodiment 1.

FIG. 2 is a schematic view showing a configuration of a microscope including a microscope adapter unit according to the present embodiment. First, explanations will be given for the configuration and operations of a microscope 1 shown in FIG. 2.

The microscope 1 shown in FIG. 2 includes a light source unit 2, a microscope main body 3, and a microscope adapter unit 4 disposed between the light source unit 2 and the microscope main body 3. The light source unit 2 includes collimation optical system CL and light source LS, and the microscope adapter unit 4 includes afocal optical system AF.

Illumination light emitted from the light source LS is converted to roughly parallel luminous fluxes (roughly parallel on-axis luminous fluxes B1 and roughly parallel off-axis luminous fluxes B2) by collimation optical system CL, and is emitted from the light source unit 2. The illumination light that was emitted from the light source unit 2 and entered the microscope adapter unit 4 as roughly parallel luminous fluxes is emitted, through the afocal optical system in the microscope adapter unit 4, to the microscope main body 3 also as roughly parallel luminous fluxes. The illumination light that entered the microscope main body 3 as roughly parallel luminous fluxes is condensed in the vicinity of the pupil of objective OB through an optical system in the microscope main body 3, and is emitted to sample surface SP through objective OB.

Although an example of disposing the microscope adapter unit 4 between the light source unit 2 and the microscope main body 3 is shown in FIG. 2, the scope of the invention is not limited to this example. The microscope adapter unit 4 may be disposed at an arbitrary point on an optical path of the illumination light between the light source unit 2 and sample surface SP, and more strictly the microscope adapter unit 4 may be disposed at an arbitrary point which is between the optical system of the light source unit 2 and the optical system of the microscope main body 3 and where the illumination light is the roughly parallel luminous fluxes in.

Also, an upright microscope is shown as the microscope 1; however, the microscope 1 may be an inverted microscope. Also, an epi-illumination system is shown as the illumination system of the microscope 1; however, the illumination system of the microscope 1 may be a transmission illumination system.

Next, the microscope adapter unit 4 according to the present embodiment will be further explained.

Afocal optical system AF included in the microscope adapter unit 4 includes a plurality of lenses (lens L1, lens L2, lens L3, and lens L4, in this order starting from the microscope main body 3), and roughly parallel luminous fluxes are generated by at least one of these lenses. In other words, afocal optical system AF includes at least a first lens to convert illumination light into roughly parallel luminous fluxes, and a second lens that the illumination light from the first lens enters, and the first lens converts illumination light into roughly parallel luminous fluxes so that the fluxes enter the second lens. In addition, in the microscope adapter unit 4 shown in FIG. 2, lens L3 functions as the first lens, and lens L2 functions as the second lens.

The microscope adapter unit 4 includes an afocal optical system that includes a lens group (first lens group) having lenses L3 and L4 and another lens group (second lens group) having lenses L1 and L2, and can be configured in such a manner that the first lens group converts illumination light into roughly parallel luminous fluxes so as to make the fluxes enter the second lens group, and thereby luminous fluxes between these lens groups are roughly parallel.

Even when the unit length has to be made greater in order to secure a space to accommodate an optical device and/or an optical unit including an optical device in the microscope adapter unit 4, generating roughly parallel luminous fluxes in the microscope adapter unit 4 can suppress vignetting that would be caused by elongating a distance between lenses over which the roughly parallel luminous fluxes travel (i.e., the distance between lenses L3 and L2). Thus, a microscope adapter unit 4 that realizes a desired illumination can be provided while suppressing the reduction in the quantity of illumination light.

An optical device and/or an optical unit is detachably disposed in the roughly parallel luminous fluxes (i.e., between lenses L3 and L2) in the microscope adapter unit 4, and as a general rule, an optical filter yields its best optical performance in parallel luminous fluxes. Accordingly, when an optical device and/or an optical unit includes an optical filter, it is desirable to generate roughly parallel luminous fluxes in the microscope adapter unit 4 to make an optical filter perform sufficiently.

Also, it is desirable that afocal optical system AF be configured in such a manner that the diameter of luminous flux of illumination light that has been converted into roughly parallel luminous fluxes by lens L3 be smaller than the diameter of luminous flux of illumination light entering the microscope adapter unit 4 and luminous flux of illumination light emitted from the microscope adapter unit 4, as shown in FIG. 2.

Having a small luminous flux of illumination light diameter is desirable also in that an optical filter with a small diameter can be used as an optical device or an optical unit.

Further, the microscope adapter unit 4 may be configured in such a manner that the distance between lenses L3 and L2 is variable, as shown in FIG. 2.

Thereby, it is possible to use a detachable optical device and/or an optical unit between lenses L3 and L2 in the microscope adapter unit 4 while reducing the distance between lenses L3 and L2 to the minimum necessary distance. Accordingly, a microscope adapter unit 4 that realizes desired illumination can be provided while minimizing losses in the quantity of illumination light.

The microscope adapter unit 4 may be designed in such a manner that the distance between lenses L3 and L2 is initially great in order to secure a space to dispose an optical device or an optical unit.

FIG. 3 is a schematic sectional view showing a configuration of a microscope adapter unit according to the present embodiment. FIG. 3 shows the microscope adapter unit 4 shown in FIG. 2.

The microscope adapter unit 4 includes an adapter 4a as a first adapter including lens L4 having a positive power and lens L3 having a negative power, and an adapter 4b as a second adapter including lens L2 having a negative power and lens L1 having a positive power, in this order starting from the light source unit 2, and is separated into the adapters 4a and 4b by a space between lenses L3 and L2 through which roughly parallel luminous fluxes pass. The adapter 4a includes a cylindrical frame 5 that fixes lenses L3 and L4, and the adapter 4b includes a cylindrical frame 6 that fixes lenses L1 and L2.

The adapters 4a and 4b each have concave portions on the side nearest to the light source unit 2, and have convex portions on the side nearest to the microscope main body 3. The concave portion of the adapter 4a is identical in shape to that of the adapter 4b, and is also identical in shape to a concave portion (not shown) of the microscope main body 3. The convex portion of the adapter 4a is identical in shape to that of the adapter 4b, and is also identical in shape to a convex portion (not shown) of the light source unit 2. Thus, in the microscope adapter unit 4, the adapter 4a and the adapter 4b can be easily attached to the attachment portion (convex portion) for the microscope main body 3 provided in the light source unit 2 and to the attachment portion (concave portion) for the light source unit 2 provided in the microscope main body 3, respectively.

Also, the inner diameters of the concave portions and the outer diameters of the convex portions are both equal to diameter D1, which is standardized as a diameter of optical devices or optical units. Thus, an existing optical device and/or an existing optical unit between the adapters 4a and 4b, i.e., between lenses L3 and L2, can easily be attached or detached as necessary.

Also, in the microscope adapter unit 4, the adapters 4a and 4b are completely separated, and accordingly there is no configurational limitation on the number of optical devices and/or optical units that can be mounted. This makes it possible to mount as many optical devices and/or optical units as necessary so that a high expandability can be provided to the microscope 1.

In addition, although FIG. 3 shows an example of afocal optical system AF including lenses having a positive, negative, negative, and positive power, in this order starting from the light source, this example does not limit the scope of the invention. It is also possible for the microscope adapter unit to include an afocal optical system including lenses having a positive, positive, positive, and positive power so as to generate roughly parallel luminous fluxes between the second and third lenses, counting from the light source.

However, in a configuration only using lenses having a positive power, the total length of the afocal optical system tends to be greater than that in the configuration shown in FIG. 3. Also, intermediate images are formed between two lenses on the light source side and between two lenses on the microscope main body side, and this makes limitations stricter in view of aberration correction. Further, the distance between lenses sandwiching intermediate image position have to be set precisely in order to generate roughly parallel luminous fluxes, and thus the lenses have to be positioned highly accurately. Accordingly, the configuration with lenses having a positive, negative, negative, and positive power as shown in FIG. 3 is more desirable as a configuration of an afocal optical system AF.

Figure 4A:
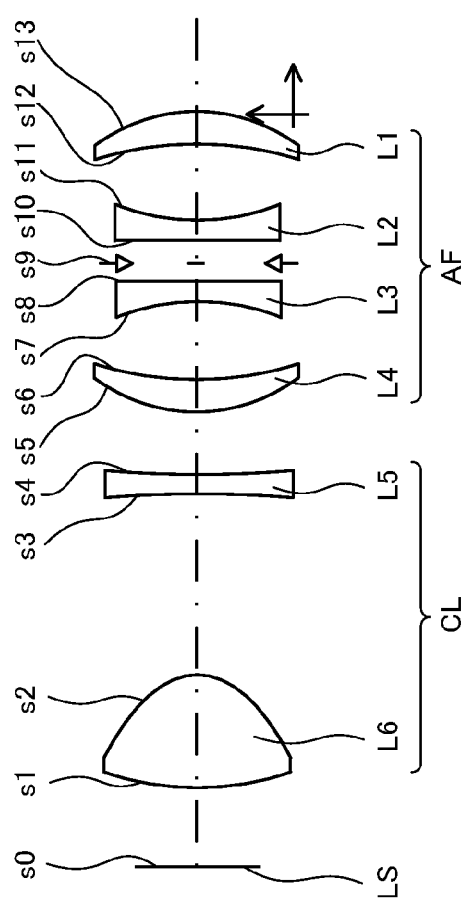
FIG. 4A is a sectional view showing an example of configurations of an afocal optical system and a collimation optical system included in the microscope adapter unit according to embodiment 1.
Figure 4B:
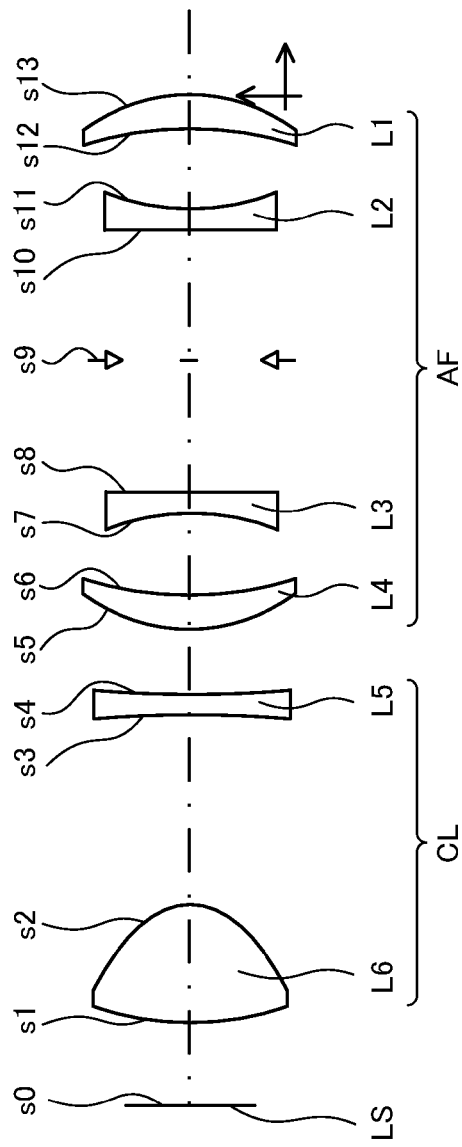
FIG. 4B is a sectional view showing an example of configurations of an afocal optical system and a collimation optical system included in the microscope adapter unit according to embodiment 1, in which a distance between lens L3 and lens L2 is greater than in FIG. 4A.
Figure 4C:
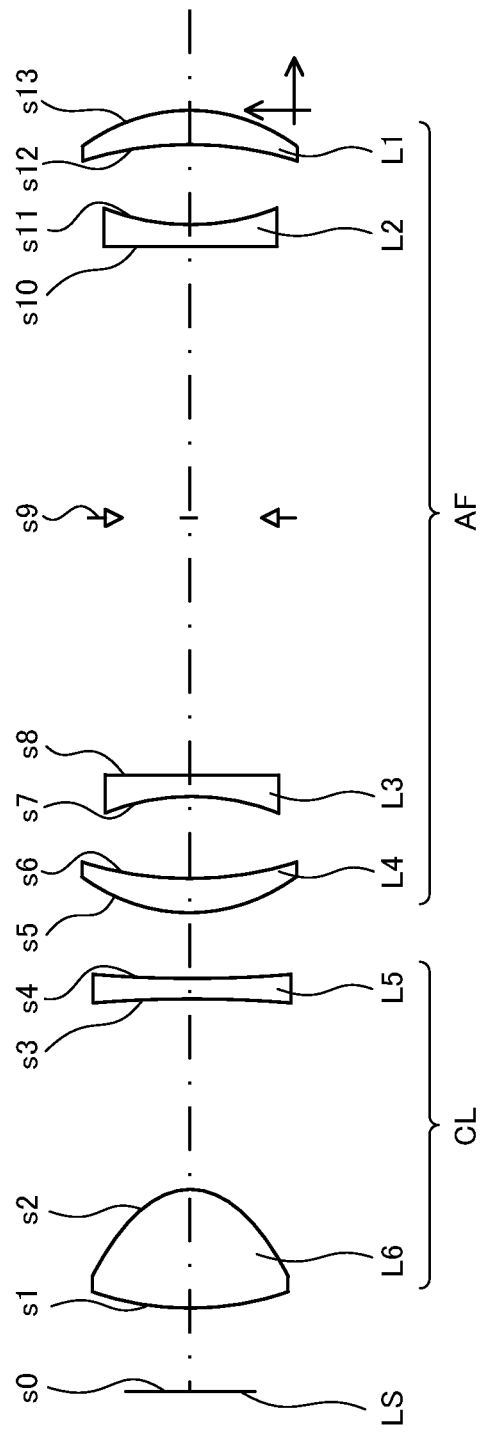
FIG. 4C is a sectional view showing an example of configurations of an afocal optical system and a collimation optical system included in the microscope adapter unit according to embodiment 1, in which a distance between lens L3 and lens L2 is greater than in FIG. 4B.

FIGS. 4A, 4B, and 4C are sectional views showing configurations of an afocal optical system and a collimation optical system included in a microscope adapter unit according to the present embodiment, and these respective views show examples of different distances between lenses L3 and L2.

FIGS. 4A through 4C show afocal optical system AF including lens L1 having a positive power, lens L2 having a negative power, lens L3 having a negative power, and lens L4 having a positive power, in this order starting from the microscope main body 3, and a collimation optical system CL including lens L5 and lens L6, which is a collector lens.

The lens data of afocal optical system AF and collimation optical system CL is as below, where s represents a surface number, r represents curvature radius (mm), d represents an interval between surfaces (mm), nd represents a refractive index with respect to line d, and vd represents the Abbe number with respect to line d. The surface specified by surface number 9 is a virtual surface expressing the middle position between lenses L2 and L3, and the surface specified by surface number zero is the surface of light source LS.

| Afocal optical system AF and collimation optical system CL | | | | |
|---|---|---|---|---|
| S | r | d | nd | vd |
| 0 | INF | 12.6256 | 1.0 | |
| 1 | 50.8207 | 18.0000 | 1.52191 | 64.14 |
| 2* | −11.9126 | 28.8025 | 1.0 | |
| 3 | −201.5701 | 3.1000 | 1.60619 | 39.29 |
| 4 | 149.9947 | 10.0000 | 1.0 | |
| 5 | 26.7000 | 5.3500 | 1.51633 | 64.14 |
| 6 | 58.1200 | 12.0000 | 1.0 | |
| 7 | −37.3000 | 3.5000 | 1.51633 | 64.14 |
| 8 | INF | Da | 1.0 | |
| 9 | INF | Da | 1.0 | |
| 10 | INF | 3.5000 | 1.51633 | 64.14 |
| 11 | 37.3000 | 12.0000 | 1.0 | |
| 12 | −58.1200 | 5.3500 | 1.51633 | 64.14 |
| 13 | −26.7000 | INF | 1.0 | |

The equation of an aspheric surface is as below, where R0 represents the curvature radius of the paraxial beam, K represents a conic constant, A2 represents a 2D aspheric surface coefficient, A4 represents a 4D aspheric surface coefficient, A6 represents a 6D aspheric surface coefficient, A8 represents an 8D aspheric surface coefficient, and A10 represents a 10D aspheric surface coefficient.

$$Z = \frac{Y^2}{R0 + R0\sqrt{1-(K+1)(Y/R0^2)}} + \sum_{j=1}^{6} A2i \cdot Y^{2i}$$

The surface specified by surface number 2 is an aspheric surface, and the conic constant and the aspheric surface coefficient are as follows.
K=−0.6751, A2=0, A4=2.3957×10$^{-6}$, A6=−3.5058×10$^{-8}$, A8=−2.7577×10$^{-10}$, A10=0

Also, distance Da is variable, and represents the distance half the lens interval between lenses L2 and L3. In FIGS. 4A, 4B, and 4C, distance Da is 3 mm, 20 mm, and 40 mm, respectively, and the lens interval between lenses L2 and L3 is 6 mm, 40 mm, and 80 mm, respectively.

As described above, according to the present embodiment, a microscope adapter unit that reduces losses in the quantity of light can be provided. Also, in the microscope adapter unit 4 according to the present embodiment, even when the interval between lenses L2 and L3 is extended, for example, to about 80 mm, losses in the quantity of light can be reduced sufficiently. Accordingly, a desired optical device and/or optical unit can be mounted between lenses L2 and L3 in order to provide a microscope adapter unit that realizes a desired illumination.

Embodiment 2

FIG. 5 is a schematic sectional view showing a configuration of a microscope adapter unit according to the present embodiment. A microscope adapter unit 7 according to the present embodiment may be included in the microscope 1 shown in FIG. 2 instead of in the microscope adapter unit 4 according to embodiment 1.

The microscope adapter unit 7 shown in FIG. 5 includes an adapter 7a as a first adapter including lens L4 having a positive power and lens L3 having a negative power, and an adapter 7b as a second adapter including lens L2 having a negative power and lens L1 having a positive power, in this order starting from the light source unit, and further includes guide rails 10 that move the adapter 7a with respect to the adapter 7b. The adapter 7a includes a cylindrical frame 8 to fix lenses L3 and L4, and the adapter 7b includes a cylindrical frame 9 to fix lenses L1 and L2.

The microscope adapter unit 7 according to the present embodiment is different from the microscope adapter unit 4 according to embodiment 1 in that it includes the guide rails 10 and the side surface on the side of the frame 8 nearest the microscope main body and the side surface on the side of the frame 9 nearest the light source are both flat.

The microscope adapter unit 7 is similar to the microscope adapter unit 4 according to embodiment 1 in other features. For example, the microscope adapter unit 7 is similar to the microscope adapter unit 4 according to embodiment 1 in that lens L3 converts illumination light into roughly parallel luminous fluxes so as to make the fluxes enter lens L2, the distance between lenses L3 and L2 is variable, and an optical device and/or optical unit between lenses L3 and L2 can be attached and detached.

As described above, according to the present embodiment too, a microscope adapter unit that reduces losses in the quantity of light can be provided. Also, by mounting a desired optical device and/or optical unit between lenses L2 and L3, a microscope adapter unit that realizes a desired illumination can be provided.

Further, in the microscope adapter unit 7, the side surface of the frame is flat, which is different from the microscope adapter unit 4 according to embodiment 1, and thus there is no limitation on the shape of an optical device and/or an optical unit between lenses L3 and L2, whether attached or detached.

Also, in the microscope adapter unit 7, the adapters 7a and 7b move relative to each other along the guide rails 10 in the directions of the optical axis, making it possible to prevent the optical axis from shifting, which may be caused when an arbitrarily shaped optical device or optical unit is mounted.

Embodiment 3

Figure 6:
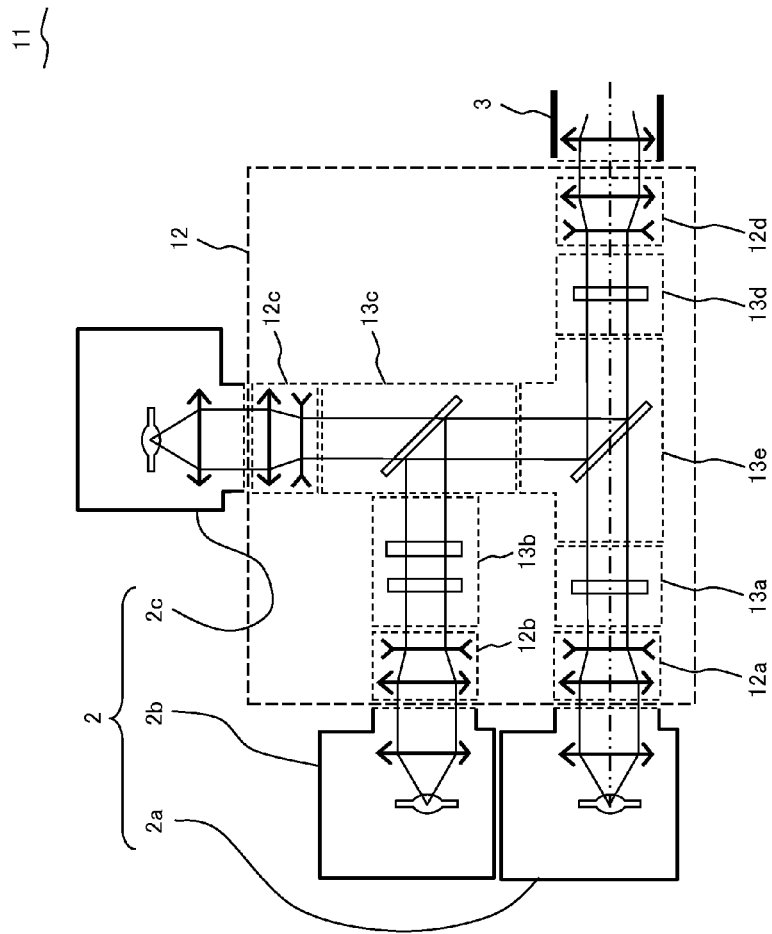
FIG. 6 is a schematic view showing an example of a configuration of a microscope including a microscope adapter unit according to embodiment 3.

FIG. 6 is a schematic view showing a configuration of a microscope including a microscope adapter unit according to the present embodiment.

A microscope 11 shown in FIG. 6 includes light source units 2 (light source units 2a through 2c), a microscope main body 3, and a microscope adapter unit 12 disposed between the light source unit 2 and the microscope main body 3.

The microscope 11 according to the present embodiment is different from the microscope adapter unit 4 according to embodiment 1 in that it includes a plurality of light source units 2 (the light source units 2a through 2c). Responding to this difference, the configuration of the microscope adapter unit 12 is also different from the microscope adapter unit 4 according to embodiment 1.

The microscope adapter unit 12 includes, between the microscope main body 3 and each of the light source units 2, an optical unit and an afocal optical system that generates roughly parallel luminous fluxes within the system. Hereinafter, specific explanations will be given for a configuration between the microscope main body 3 and each of the light source unit 2.

First, attention is focused on a configuration between the light source unit 2a and the microscope main body 3. The microscope adapter unit 12 includes an adapter 12a, an optical unit 13a, an optical unit 13e, an optical unit 13d, and an adapter 12d.

The adapter 12a mounted to the light source unit 2a includes at least a lens that converts, into roughly parallel luminous fluxes, illumination light emitted from the light source unit 2a, and emits the roughly parallel luminous fluxes. The configuration of the adapter 12a is similar to, for example, that of the adapter 4a shown in FIG. 2. The adapter 12d mounted on the microscope main body 3 includes a lens that the roughly parallel luminous fluxes enter. The configuration of the adapter 12d is similar to, for example, that of the adapter 4b shown in FIG. 2. The adapters 12a and 12d operate together to function as an afocal optical system so that the roughly parallel luminous fluxes emitted from the light source unit 2a enter the microscope main body 3 as the roughly parallel luminous fluxes.

The optical units 13a, 13e, and 13d are detachably provided between the adapters 12a and 12d through which the roughly parallel luminous fluxes pass, and thereby desired illumination is realized. In an exemplary configuration, the optical units 13a and 13d may include optical filters, and the optical unit 13e may include a dichroic mirror.

Next, attention is focused on the configuration between the light source unit 2b and the microscope main body 3. The microscope adapter unit 12 includes an adapter 12b, optical units 13b, 13c, 13e, and 13d, and an adapter 12d.

The adapter 12b mounted on the light source unit 2b includes at least a lens that converts, into roughly parallel luminous fluxes, illumination light emitted from the light source unit 2b, and emits the roughly parallel luminous fluxes. The configuration of the adapter 12b is similar to, for example, that of the adapter 4a shown in FIG. 2. The adapters 12b and 12d operate together to function as an afocal optical system so that the roughly parallel luminous fluxes emitted from the light source unit 2b enter the microscope main body 3 as the roughly parallel luminous fluxes.

Also, the optical units 13b, 13c, 13e, and 13d are detachably provided between the adapters 12b and 12d through which roughly parallel luminous fluxes pass, and this realizes a desired illumination. In an exemplary configuration, the optical unit 13d may include an optical filter, and the optical units 13c and 13e may include dichroic mirrors. Also, the optical unit 13b may include an optical filter and a conversion lens having a function of changing luminous flux diameter.

Further, when attention is focused on the configuration between the light source unit 2c and the microscope main body 3, the microscope adapter unit 12 includes an adapter 12c, the optical units 13c, 13e, and 13d, and the adapter 12d.

The adapter 12c mounted on the light source unit 2c includes at least a lens that converts, into roughly parallel luminous fluxes, illumination light emitted from the light source unit 2c, and emits the roughly parallel luminous fluxes. The configuration of the adapter 12c is similar to, for example, that of the adapter 4a shown in FIG. 2. The adapters 12c and 12d operate together to function as an afocal optical system so that the roughly parallel luminous fluxes emitted from the light source unit 2c enter the microscope main body 3 as the roughly parallel luminous fluxes.

Also, the optical units 13c, 13e, and 13d are detachably provided between the adapters 12c and 12d through which roughly parallel luminous fluxes pass, and this realizes a desired illumination. In an exemplary configuration, the optical unit 13d may include an optical filter, and the optical units 13c and 13e may include dichroic mirrors.

As described above, also according to the present embodiment, a microscope adapter unit that reduces losses in the quantity of light can be provided. Also, a desired optical device and/or optical unit can be mounted, and thereby a microscope adapter unit that realizes a desired illumination can be provided.

Further, in the microscope adapter unit 12, illumination light emitted from a plurality of light source units 2 can be guided to the microscope main body 3 simultaneously or selectively, which is different from the microscope adapter unit 4 according to embodiment 1.

In addition, as is shown in FIG. 6, a configuration having the plural light source units 2 needs an optical path dividing device such as a dichroic mirror in order to guide illumination light from the plural light source units 2 to the microscope main body 3. This usually makes the distance between the light source unit 2 and the microscope main body 3 greater than that in a configuration having only one light source unit 2. Therefore, a microscope adapter unit 12 according to the present embodiment that can sufficiently reduce losses in the quantity of light even when the distance between the light source unit 2 and the microscope main body 3 is great is preferable for a configuration having a plurality of the light source units 2.

Embodiment 4

Figure 7:
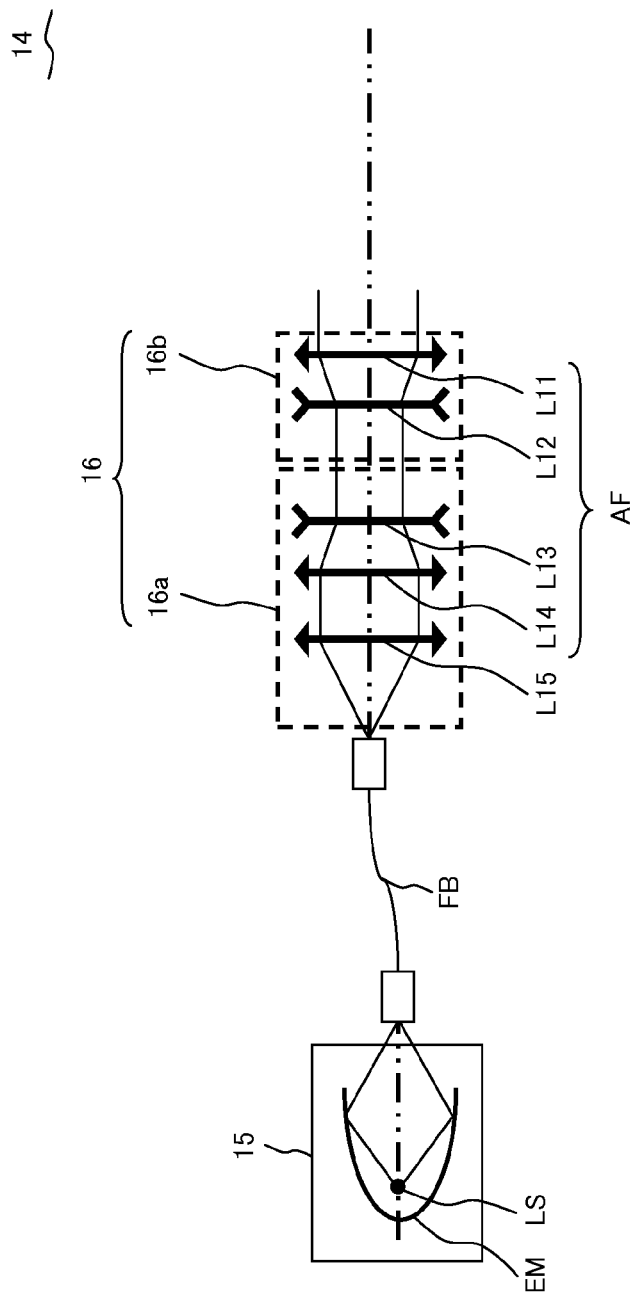
FIG. 7 is a schematic view showing an example of part of a configuration of a microscope including a microscope adapter unit according to embodiment 4.

FIG. 7 is a schematic view showing a configuration of a microscope including a microscope adapter unit according to the present embodiment. A microscope 14 shown in FIG. 7 includes a light source unit 15, fibers FB, a microscope adapter unit 16, and a microscope main body (not shown). The microscope main body of the microscope 14 is similar to the microscope main body 3 of the microscope 1 according to embodiment 1 shown in FIG. 2.

The light source unit 15 is a light source unit used together with fibers FB, and includes a light source LS and an elliptic mirror EM that is an optical system to converge illumination light from the light source LS.

The microscope adapter unit 16 is disposed between the fibers FB connected to the light source unit 15 and the microscope main body, and includes a first lens group having lens L15, lens L14, and lens L13, and a second lens group having lens L12 and lens L11, in this order starting from the light source unit.

Lens L15 is a lens that converts, into roughly parallel luminous fluxes, illumination light emitted from fibers FB, and lenses L14, L13, L12, and L11 are configured as afocal optical system AF.

The microscope adapter unit 16 includes an adapter 16a having the first lens group and an adapter 16b having the second lens group, and is separated between the first and second lens groups. Also, an optical device or an optical unit including an optical device can be attaching and detaching between the adapters 16a and 16b, and the distance between the adapters 16a and 16b is variable.

Illumination light emitted from light source LS is condensed by elliptic mirror EM to the entering edge of fibers FB, and is emitted as a divergent luminous flux from the emission edge of fibers FB. Illumination light entering the microscope adapter unit 16 as a divergent luminous flux is converted into roughly parallel luminous fluxes by the first lens group, and enters the second lens group.

More specifically, first, the illumination light is converted into roughly parallel luminous fluxes by lens L15, and is converted by lenses L14 and L13 into roughly parallel luminous fluxes with a luminous flux smaller in diameter. Further, the roughly parallel luminous fluxes are converted by lenses L12 and L11 into roughly parallel luminous fluxes with a luminous flux having the diameter required by the microscope main body, and are emitted from the microscope adapter unit 16.

As described above, the microscope adapter unit 16 is similar to the microscope adapter unit 4 according to embodiment 1 in that the first lens group converts illumination light into roughly parallel luminous fluxes so as to make the fluxes enter the second lens group.

According to the present embodiment, it is possible to provide a microscope adapter unit that brings about the same effect that the microscope adapter unit 4 according to embodiment 1 brings about even when it is used for a microscope including a light source unit used together with fibers FB.

Specifically, even when the unit length has to be made greater in order to secure a space to accommodate an optical device and/or an optical unit including an optical device, it is possible to suppress vignetting. Thus, the desired illumination can be realized while suppressing the reduction in the quantity of illumination light.

Also, because the roughly parallel luminous flux emitted from the first lens group has a smaller diameter than that of the luminous flux of illumination light entering the microscope adapter unit 16, a greater effect of suppressing losses in the quantity of light can be achieved. Further, a relatively smaller optical device and optical unit can be used.

Further, because roughly parallel luminous fluxes enter an optical device or an optical unit, the performance of such a device or unit can be utilized sufficiently.

Embodiment 5

Figure 8:
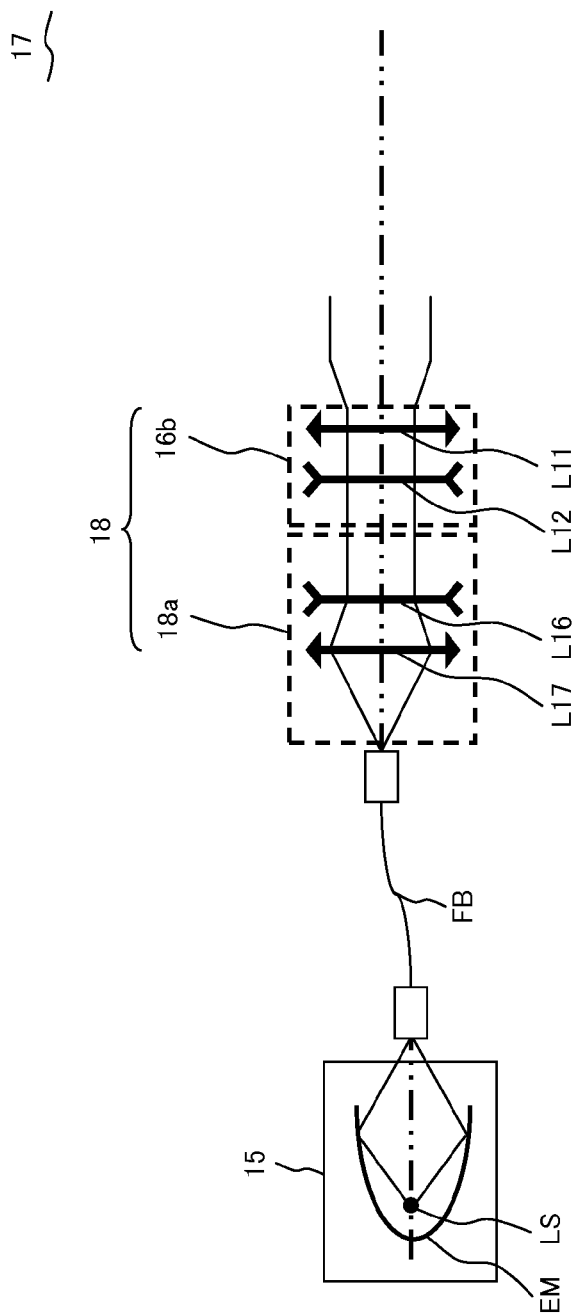
FIG. 8 is a schematic view showing an example of part of a configuration of a microscope including a microscope adapter unit according to embodiment 5.

FIG. 8 is a schematic view showing part of a configuration of a microscope including a microscope adapter unit according to the present embodiment. A microscope 17 shown in FIG. 8 is different from the microscope 14 according to embodiment 4 shown in FIG. 7 in that the microscope 17 includes a microscope adapter unit 18 instead of the microscope adapter unit 16.

The adapter unit 18 is disposed between the microscope main body and the fibers FB connected to the light source unit 15, and includes a first lens group having lens L17 and lens L16, and a second lens group having lens L12 and lens L11, in this order starting from the light source unit.

Further, the microscope adapter unit 18 includes an adapter 18a having the first lens group and an adapter 16b having the second lens group, and is separated into the adapters 18a and 16b by the space between the first and second lens groups. Also, it is possible to attach and detach an optical device or an optical unit including an optical device existing between the adapters 18*a* and 16*b* in the microscope adapter unit 18, and it is also possible to vary the distance between the adapters 18*a* and 16*b*.

In other words, the microscope adapter unit 18 is different from the microscope adapter unit 16 in the configuration of the first lens group.

The first lens group of the microscope adapter unit 18 converts illumination light into a converged luminous flux by using lens L17 having a positive power, and converts the converged luminous flux into roughly parallel luminous fluxes by using lens L16 having a negative power. Thus, the first group of the microscope adapter unit 18 is similar to the first lens group of the microscope adapter unit 16 in that it converts illumination light entering as a divergent luminous flux into roughly parallel luminous fluxes so that the roughly parallel luminous fluxes enter the second lens group.

Also, the microscope adapter unit 18 is similar to the microscope adapter unit 16 in that the roughly parallel luminous flux emitted from the first lens group has a smaller diameter than that of the entering luminous flux and the emitted luminous flux.

Thus, according to the present embodiment, a microscope adapter unit that achieves the same effect as achieved by the microscope adapter unit 16 according to embodiment 4 can be provided.

Embodiment 6

In recent years, in the field of fluorescence observation, there has been an increasing demand for an expansion of the quantity of time that can be used for experiments, a wider range of excitation wavelengths and observation wavelengths, simultaneity in observations using multiple wavelengths, reduction of damage to biological samples, etc.

As an example of an extension of time for an experiment, there is an experiment in which cells are cultured while keeping them alive in order to obtain images of them at constant intervals during the culturing.

As an example of a wider range of excitation wavelengths and observation wavelengths, there is an observation in which filters that select different excitation wavelengths and fluorescence wavelengths are switched in order to observe an indicator substance by using a plurality of types of fluorochrome or fluorescent protein.

As an example of simultaneity in observations using multiple wavelengths, there is an observation in which the above filters are switched at high speed so as to observe a plurality of materials included in a single sample simultaneously or at as short of time intervals as possible.

As an example of reducing damage to a biological sample, there is a method by which a minimum quantity of light necessary for performing an observation is emitted by switching neutral density filters that adjust the quantity of light or by opening/closing the shutter so as to prevent unnecessary optical energy from being emitted to damage the sample.

A filter switching unit and a shutter unit that are electrically controlled as necessary are required in order to meet this demand. However, the addition of these units on the optical path of illumination light causes losses in the quantity of light. Thus, using a microscope adapter unit that includes a first lens group to convert illumination light into roughly parallel luminous fluxes, and that includes a second lens group which the roughly parallel luminous fluxes after the conversion enter as shown in embodiments 1 through 5, is very effective in suppressing light loss.

It is known that observations are affected by vibrations and heat that have been caused by operations of a filter switching unit and a shutter unit and that have been conducted to the microscope main body.

Disposing a filter switching unit and a shutter unit between the light source unit and fibers is effective in reducing these influences. This is because vibrations and heat are conducted to the microscope main body through a fibers so as to suppress the conduction of heat and vibrations, and thereby the above influences are reduced. Accordingly, the above configuration in which a microscope adapter unit is disposed between the light source unit and the fibers is preferable.

Figure 9:
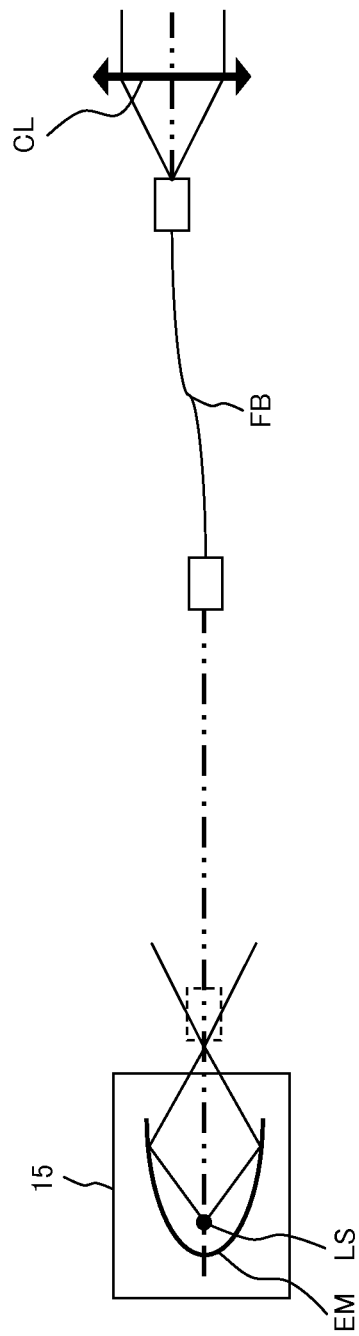
FIG. 9 explains the loss of a quantity of light occurring between a light source unit and fibers.

Also, as shown in FIG. 9, fibers FB cannot be disposed at the most optimum position, i.e., at the point to which illumination light is condensed in a configuration in which a filter switching unit and a shutter unit are directly mounted between the light source unit 15 and the fibers FB. Thus, this causes losses in the quantity of light due to not being able to dispose fibers FB at the optimum position, in addition to losses in the quantity of light caused by adding a filter switching unit and a shutter unit. Further, as the number of units disposed between the light source unit 15 and fibers FB increases, greater quantity of light is lost.

Figure 10A:
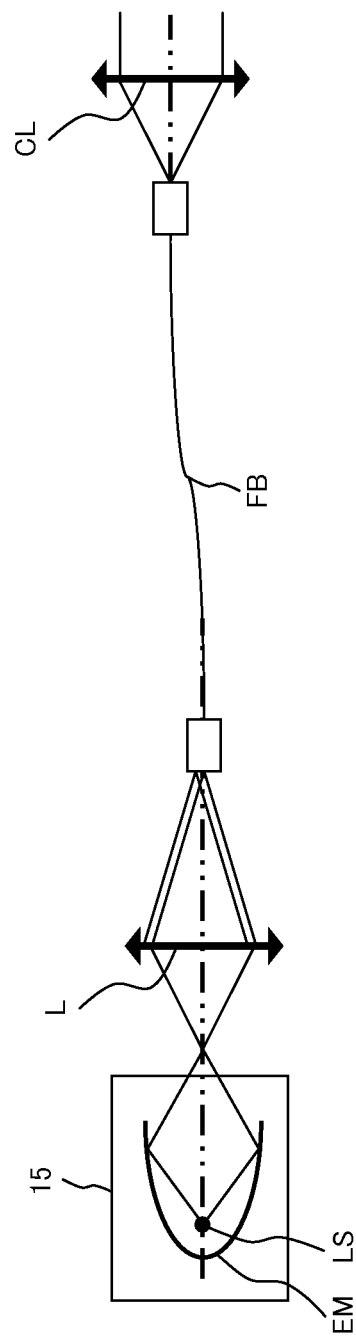
FIG. 10A explains the loss of a quantity of light occurring between a light source unit and fibers, with a movable lens disposed between the light source unit and the fibers.

Also, as shown in FIGS. 10A and 10B, a configuration in which the distance between the light source unit 15 and fibers FB is varied by disposing movable lens L so as to secure a space in which a filter switching unit and a shutter unit are provided results in light not being able to enter the fibers because of the variation in the projection magnification of the light source image. Thus, in addition to losses in the quantity of light caused by the addition of a filter switching unit and a shutter unit, losses in the quantity of light are also caused by the variation in the projection magnification of the light source image.

As is obvious from the examples in FIGS. 9, 10A, and 10B, if a filter switching unit and a shutter unit are disposed between the light source unit and the fibers, the use of the microscope adapter unit is very effective. Because it makes it possible to reduce the influence on observations caused by heat and vibrations, whereas the microscope adapter unit suppresses losses in the quantity of light.

In addition, when the microscope adapter unit is disposed between the light source unit and the fibers, illumination light emitted from the microscope adapter unit enters the fibers instead of the microscope main body. Thus, the microscope adapter unit needs to emit illumination light as a converged luminous flux.

Hereinafter, specific explanations will be given for the microscope adapter unit disposed between the light source unit and the fibers.

Figure 11:
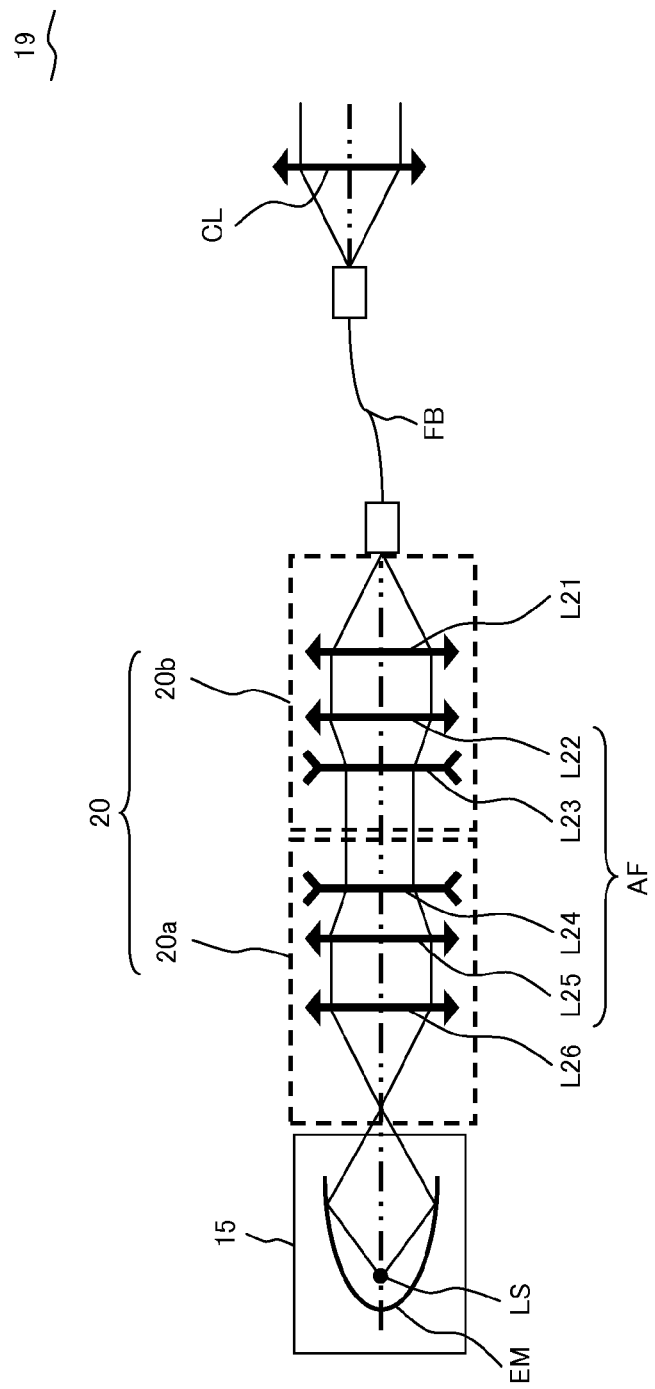
FIG. 11 is a schematic view showing an example of part of a configuration of a microscope including a microscope adapter unit according to embodiment 6.

FIG. 11 is a schematic view showing part of a configuration of a microscope including a microscope adapter unit according to the present embodiment. A microscope 19 shown in FIG. 11 includes the light source 15, a microscope adapter unit 20, fibers FB, collimation optical system CL that converts, into roughly parallel luminous fluxes, illumination emitted from fibers FB, and a microscope main body (not shown). The microscope main body of the microscope 19 is similar to the microscope main body 3 of the microscope 1 according to embodiment 1 shown in FIG. 2.

The light source unit 15 is a light source unit that is used together with fibers FB, and includes light source LS and elliptic mirror EM, which is an optical system to converge illumination light emitted from light source LS.

The microscope adapter unit 20 is disposed between the light source unit 15 and fibers FB, and includes a first lens group including lens L26, lens L25, and lens L24, and a second lens group including lens L23, lens L22, and lens L21, in this order starting from the light source unit.

Lens L26 is a lens that converts, into roughly parallel luminous fluxes, illumination light entering from the light source image as a divergent luminous flux. Lenses L25, L24, L23, and L22 are configured as afocal optical system AF. Lens L21 converges illumination light emitted from afocal optical system AF as roughly parallel luminous fluxes in order to condense the light to the entering edge of fibers FB.

Further, the microscope adapter unit 20 includes an adapter 20a having a first lens group and an adapter 20b having a second lens group, and is separated into the adapters 20a and 20b by the space between the first and second lens groups. Also, an optical device or an optical unit including an optical device between the adapters 20a and 20b can be attached and detached, and the distance between the adapters 20a and 20b is variable.

Illumination light emitted from light source LS forms a light source image through elliptic mirror EM, and thereafter enters the microscope adapter unit 20 as a divergent luminous flux.

Illumination light that enters the microscope adapter unit 20 as a divergent luminous flux is converted by the first lens group into roughly parallel luminous fluxes, and the roughly parallel luminous fluxes enter the second lens group. The illumination light is converted by the second lens group into a converged luminous flux, and the converged luminous flux is emitted from the microscope adapter unit 20.

More specifically, illumination light is first converted into roughly parallel luminous fluxes by lens L26, and is converted by lenses L25 and L24 into roughly parallel luminous fluxes having a luminous flux with a smaller diameter. Further, the roughly parallel luminous fluxes are converted by lenses L23 and L22 into roughly parallel luminous fluxes having a greater diameter. Thereafter, the roughly parallel luminous fluxes are emitted from the microscope adapter unit 20 at NA required by fibers FB.

Illumination light emitted from the microscope adapter unit 20 is condensed to the entering edge of fibers FB, and enters the microscope main body through fibers FB and collimation optical system CL.

As described above, the microscope adapter unit 20 is similar to the microscope adapter unit 4 according to embodiment 1 in that the first lens converts illumination light into roughly parallel luminous fluxes so that the roughly parallel luminous fluxes enter the second lens.

Thus, according to the present embodiment, a microscope adapter unit that achieves the same effect as is achieved by the microscope adapter unit 4 according to embodiment 1 can be provided.

Specifically, even when the unit length has to be made greater in order to secure a space to accommodate an optical device and/or an optical unit including an optical device, it is possible to suppress vignetting. Thus, desired illumination can be realized while suppressing the reduction in the quantity of illumination light.

Also, because roughly parallel luminous fluxes emitted from the first lens group have a smaller diameter than those of the luminous flux of illumination light entering the microscope adapter unit 20 and than those of the luminous flux of illumination light emitting the microscope adapter unit 20, a higher suppression of losses in the quantity of light can be achieved. Further, relatively smaller optical devices and optical units can be used.

Further, because roughly parallel luminous fluxes enter an optical device or an optical unit, the performance of such a device or unit can be utilized sufficiently.

Further, according to the present embodiment, because fibers FB exists between the microscope adapter unit 20 and the microscope main body, heat and vibrations caused in the microscope adapter unit 20 are not easily conducted to the microscope main body. Thus, the influence on observation of heat and vibrations can be reduced in terms of the entire microscope.

Embodiment 7

Figure 12:
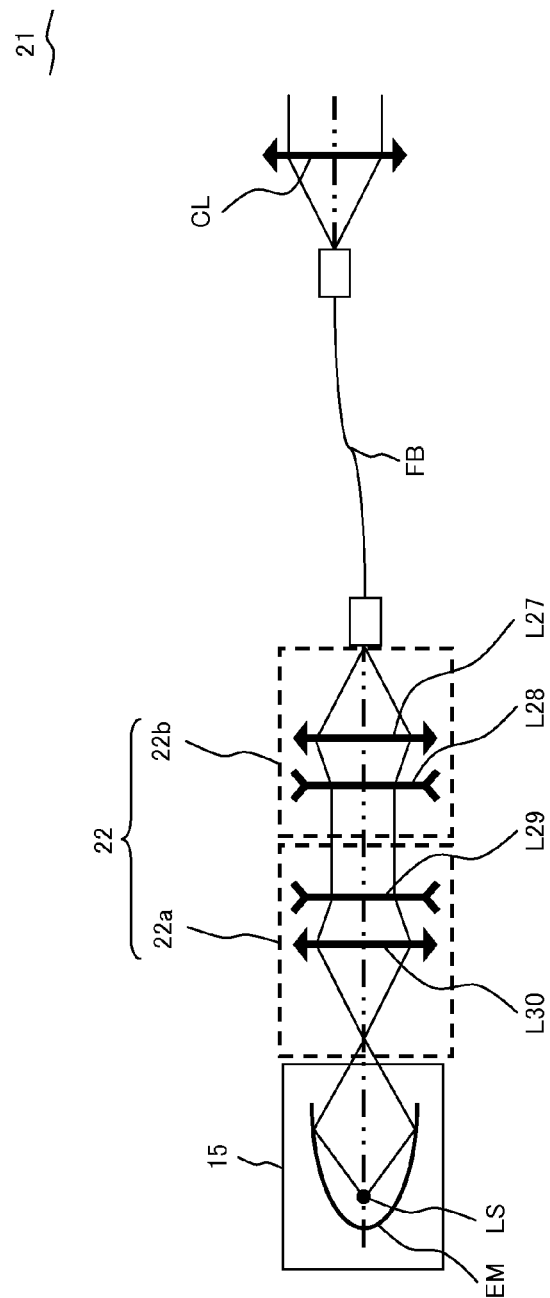
FIG. 12 is a schematic view showing an example of part of a configuration of a microscope including a microscope adapter unit according to embodiment 7.

FIG. 12 is a schematic view showing part of a configuration of a microscope including a microscope adapter unit according to the present embodiment. A microscope 21 shown in FIG. 12 is different from the microscope 19 according to embodiment 6 shown in FIG. 11 in that it includes a microscope adapter unit 22 instead of the microscope adapter unit 20.

The microscope adapter unit 22 is disposed between the light source unit 15 and fibers FB, and includes a first lens group having lens L30 and lens L29, and a second lens group having lens L28 and lens L27, in this order starting from the light source unit.

Further, the microscope adapter unit 22 includes a first adapter 22a having the first lens group, and a second adapter 22b having the second lens group, and is separated into the adapters 22a and 22b by the space between the first and second lens groups. In the microscope adapter unit 22, an optical device and an optical unit including an optical device between the adapters 22a and 22b can be attached and detached, and the distance between adapters 22a and 22b is variable.

The first lens group of the microscope adapter unit 22 converts illumination light into a converged luminous flux by using lens L30 having a positive power, and converts the illumination light into roughly parallel luminous fluxes by using lens L29 having a negative power. The second lens group converts illumination light into a divergent luminous flux by using lens L28 having a negative power, and converts the flux into a converged luminous flux by using lens L27 having a positive power so that the resultant light is emitted from the microscope adapter unit 20 at NA required by fibers FB.

As described above, the microscope adapter unit 22 is similar to the microscope adapter unit 20 according to embodiment 6 in that the first lens group converts illumination light into roughly parallel luminous fluxes so that the roughly parallel luminous fluxes enter the second lens group.

The microscope adapter unit 22 is similar to the microscope adapter unit 20 also in that the roughly parallel luminous flux emitted from the first lens group has a diameter smaller than that of the entering luminous flux and has a diameter smaller than that of luminous flux being emitted.

Thus, according to the present embodiment, a microscope adapter unit that achieves the same effect as that achieved by the microscope adapter unit 20 according to embodiment 6 can be provided.

Further, because fibers FB exists between the microscope adapter unit 22 and the microscope main body, heat and vibrations caused in the microscope adapter unit 22 are not easily conducted to the microscope main body. Thus, the influence on observation of heat and vibrations can be reduced in terms of the entire microscope.

Embodiment 8

Figure 13:
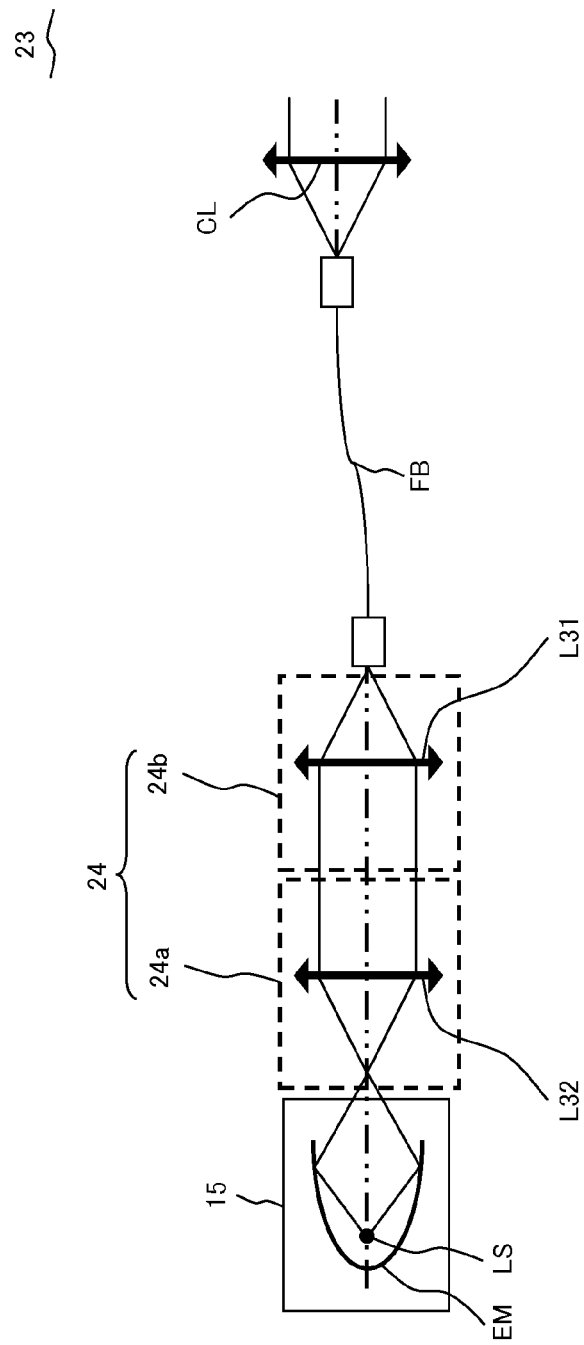
FIG. 13 is a schematic view showing an example of part of a configuration of a microscope including a microscope adapter unit according to embodiment 8.

FIG. 13 is a schematic view showing part of a configuration of a microscope including a microscope adapter unit according to the present embodiment. A microscope 23 shown in FIG. 13 is different from the microscope 19 according to embodiment 6 shown in FIG. 11 in that it includes a microscope adapter unit 24 instead of the microscope adapter unit 20.

The microscope adapter unit 24 is disposed between the light source unit 15 and fibers FB, and includes a first lens group having lens L32 and a second lens group having lens L31, in this order starting from the light source unit.

Further, the microscope adapter unit 24 includes an adapter 24a having a first lens group and an adapter 24b having a second lens group, and is separated into the adapters 24a and 24b by the space between the first and second lens groups. Also, in the microscope adapter unit 24, an optical device and an optical unit including an optical device between the adapters 24a and 24b may be attached and detached, and the distance between the adapters 24a and 24b is variable.

The first lens group of the microscope adapter unit 24 converts illumination light into roughly parallel luminous fluxes by using lens L32 having a positive power. The second lens group converts illumination light into a converged luminous flux by using lens L31 having a positive power, and emits the converged luminous flux through the microscope adapter unit 24 at NA required by fibers FB.

As described above, the microscope adapter unit 24 is similar to the microscope adapter unit 20 according to embodiment 6 in that it has the first lens group to convert illumination light into roughly parallel luminous fluxes in order to make the roughly parallel luminous fluxes enter the second lens group.

Thus, according to the present embodiment, a microscope adapter unit that achieves the same effect as that achieved by the microscope adapter unit 20 according to embodiment 6 can be provided.

Further, because fibers FB exists between the microscope adapter unit 24 and the microscope main body, heat and vibrations caused in the microscope adapter unit 24 are not easily conducted to the microscope main body. Thus, similarly to the microscope 19 according to embodiment 6, the influence on observation of heat and vibrations can be reduced in terms of the entire microscope.

Note that although spaces are shown between the microscope adapter units and other constituent members in some drawings, the microscope adapter units and other constituent members are connected mechanically. This point applies to all the embodiments described above.

What is claimed is:

1. A microscope adapter unit disposed on an optical path of illumination light leading from a light source unit having a light source to a sample surface via a microscope main body, wherein the microscope adapter unit is disposed on the optical path between the light source unit and the microscope main body, and the light source unit has an optical system that converges or makes parallel the illumination light emitted from the light source, the microscope adapter unit comprising:
an afocal optical system which comprises a first lens group and a second lens group,
wherein:
the first lens group converts the illumination light into roughly parallel luminous fluxes, and makes the illumination light enter the second lens group;
the afocal optical system comprises, in order along the optical path starting from the light source unit:
a third lens that is included in the first lens group, and that has a positive power;
a first lens that is included in the first lens group, and that has a negative power;
a second lens that is included in the second lens group, and that has a negative power; and
a fourth lens that is included in the second lens group, and that has a positive power; and
the afocal optical system is configured such that (i) a distance between the first lens and the third lens in the first lens group is not variable, (ii) a distance between the second lens and the fourth lens in the second lens group is not variable, (iii) a distance between the first lens and the second lens is variable, and (iv) the illumination light that has been converted into the roughly parallel luminous fluxes by the first lens group has a smaller luminous flux diameter than that of the illumination light entering the microscope adapter unit and that of illumination light emitted from the microscope adapter unit.

2. The microscope adapter unit according to claim 1, further comprising:
a first adapter including the first lens group; and
a second adapter including the second lens group,
wherein:
the microscope adapter unit is separated into the first adapter and the second adapter by a space between the first lens group and the second lens group.

3. The microscope adapter unit according to claim 1, further comprising:
a first adapter including the first lens group;
a second adapter including the second lens group; and
a guide rail to move the first adapter with respect to the second adapter relatively.

4. A microscope comprising:
a light source unit having a light source and an optical system that converges or makes parallel illumination light emitted from the light source;
a microscope main body; and
a microscope adapter unit disposed between the light source unit and the microscope main body on an optical path of the illumination light leading from the light source unit to a sample surface via the microscope main body,
wherein the microscope adapter unit comprises an afocal optical system which comprises a first lens group and a second lens group,
wherein the first lens group converts the illumination light into roughly parallel luminous fluxes, and makes the illumination light enter the second lens group;
wherein the afocal optical system comprises, in order along the optical path starting from the light source unit:
a third lens that is included in the first lens group, and that has a positive power;
a first lens that is included in the first lens group, and that has a negative power;
a second lens that is included in the second lens group, and that has a negative power; and
a fourth lens that is included in the second lens group, and that has a positive power; and
wherein the afocal optical system is configured such that (i) a distance between the first lens and the third lens in the first lens group is not variable, (ii) a distance between the second lens and the fourth lens in the second lens group is not variable, (iii) a distance between the first lens and the second lens is variable, and (iv) the illumination light that has been converted into the roughly parallel luminous fluxes by the first lens group has a smaller luminous flux diameter than that of the illumination light entering the microscope adapter unit and that of illumination light emitted from the microscope adapter unit.

5. The microscope according to claim 4, wherein the microscope adapter unit further comprises:
a first adapter including the first lens group; and
a second adapter including the second lens group, and
wherein the microscope adapter unit is separated into the first adapter and the second adapter by a space between the first lens group and the second lens group.

6. The microscope according to claim 4, wherein the microscope adapter unit further comprises:
a first adapter including the first lens group;
a second adapter including the second lens group; and
a guide rail to move the first adapter with respect to the second adapter relatively.

* * * * *